(12) United States Patent
Park et al.

(10) Patent No.: US 8,767,249 B2
(45) Date of Patent: Jul. 1, 2014

(54) METHOD FOR GENERATING TAG LAYOUTS

(75) Inventors: Minwoo Park, Pittsford, NY (US);
Dhiraj Joshi, Rochester, NY (US);
Alexander C. Loui, Penfield, NY (US);
Amit Singhal, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 13/598,202

(22) Filed: Aug. 29, 2012

(65) Prior Publication Data
US 2014/0063555 A1 Mar. 6, 2014

(51) Int. Cl.
*G06F 15/00* (2006.01)
*G06F 3/12* (2006.01)
*G06K 1/00* (2006.01)
*G06F 17/30* (2006.01)
*G06F 17/24* (2006.01)
*G06K 15/02* (2006.01)

(52) U.S. Cl.
CPC .......... *G06F 17/30905* (2013.01); *G06F 17/24* (2013.01); *G06K 15/02* (2013.01)
USPC ........................................ 358/1.18; 358/1.13

(58) Field of Classification Search
CPC .... G06F 17/30905; G06F 17/24; G06K 15/02
USPC ................................ 358/1.11, 1.13, 1.18, 3.27
See application file for complete search history.

(56) References Cited

U.S. PATENT DOCUMENTS

| | | | |
|---|---|---|---|
| 7,085,999 B2 * | 8/2006 | Maeda et al. | 715/236 |
| 8,113,727 B2 * | 2/2012 | Niwa et al. | 400/76 |
| 2004/0233163 A1 | 11/2004 | Lapstun | |
| 2009/0300506 A1 | 12/2009 | Drucker | |
| 2010/0001069 A1 | 1/2010 | Silverbrook | |

OTHER PUBLICATIONS

Lawrence Page, Sergey Brin, Rajeev Motwani, Terry Winograd—(1999)—"The PageRank Citation Ranking: Bringing Order to the Web"—Technical Report—Stanford InfoLab—pp. 1-17.

* cited by examiner

*Primary Examiner* — Douglas Tran
(74) *Attorney, Agent, or Firm* — Amit Singhal

(57) ABSTRACT

Generating a tag layout from a set of tags and an ordering of the set of tags, wherein each tag includes a text label and a size for the text label, is disclosed. The method further includes receiving at least one closed shape corresponding to a space for the tag layout. A processor computes a scale factor for at least one of the closed shape or the size of the text labels in the set of tags to generate the tag layout of the set of tags within the closed shape such that all the tags in the set of tags fit within the closed shape and the tags are placed in the space based at least upon the ordering of the tags in the set of tags.

19 Claims, 13 Drawing Sheets

METHOD FOR GENERATING TAG LAYOUTS

CROSS REFERENCE TO RELATED APPLICATIONS

Reference is made to commonly assigned U.S. patent application Ser. No. 13/598,260 filed concurrently herewith, entitled "System For Generating Tag Layouts", the disclosure of which is incorporated by reference herein in its entirety.

Reference is made to commonly assigned U.S. patent application Ser. No. 13/598,310 filed concurrently herewith, entitled "Method For Computing Scale For Tag Insertion", the disclosure of which is incorporated by reference herein in its entirety.

FIELD OF THE INVENTION

This invention relates to the field of generating layouts of shapes, and more particularly to a method and system for generating layouts for an ordered set of first shapes placed within a second set of closed shapes by appropriate scaling.

BACKGROUND OF THE INVENTION

In recent years, information on the World Wide Web has grown drastically and is continuing to do so at an ever increasing rate. The prevalence of social media culture has resulted in the digitization of all aspects of lives (i.e. from conversations to celebrations). In other words, human lives have largely become synonymous with the information we consume and share on the Web. Today's man is surrounded by a plethora of information of various kinds in his disparate digital devices. Ironically, the time slice devoted for consumption of a given piece of information is decreasing by the day. Therefore, the need for concise and meaningful information presentation has become critical.

Undoubtedly, text constitutes the most abundant form of information on the Web. However, the structure of text on the Web can vary from extremely un-syntactical (e.g. tags or short form sentences) to very structured (e.g. well written and edited articles). Of late, tag-clouds have gained significance as a way to visualize structured as well as unstructured text. A tag-cloud is a visual depiction of the word content of a document. A tag-cloud can provide a quick word-content summary of large documents, collections, or tag-sets. It can be constructed by tag-frequencies or derived from an ordered tag-set by using tag-weights. An appealing aspect of tag-clouds is the presentation of the relative emphasis or importance of different words or concepts in a seemingly simple manner that a human eye can quickly discern (in contrast to listing numeric weights against different words).

Prior art in generating layouts of tag-clouds for visualization limits the shape of tag layouts or does not preserve the ordering of the set of tags. In addition, prior art for generating tag layouts can result in layouts with tags repeated to fill the space, or omitted due to lack of space, described by the shape instead of scaling the tags or the shapes to achieve a good fit.

SUMMARY OF THE INVENTION

The present invention is directed to producing a combined image of a layout by placing a first set of shapes within a second set of shapes while preserving criteria including a certain ordering of the first set of shapes, amount of overlap of the first set of shapes as placed in the second set of shapes, or the scaling of the first or second set of shapes.

According to the present invention, a method for generating a tag layout comprises:

receiving a set of tags, each tag including a text label and a size for the text label;

receiving an ordering of the set of tags;

receiving at least one closed shape corresponding to a space for the tag layout;

using a processor to compute a scale factor for at least one of the closed shape or the size of the text labels in the set of tags to generate the tag layout of the set of tags within the closed shape such that all the tags in the set of tags fit within the closed shape and the tags are placed in the space based at least upon the ordering of the tags in the set of tags; and storing the generated tag layout in processor accessible memory.

An advantage of the present invention is that the generated layout is of an arbitrary given shape and compact and the ordering of the first set of shapes is preserved in the layout. This provides an improved visual representation of the first set of shapes in the layout.

It is to be understood that the attached drawings are for purposes of illustrating aspects of the invention and may not be to scale.

DETAILED DESCRIPTION OF THE INVENTION

Figure 1:
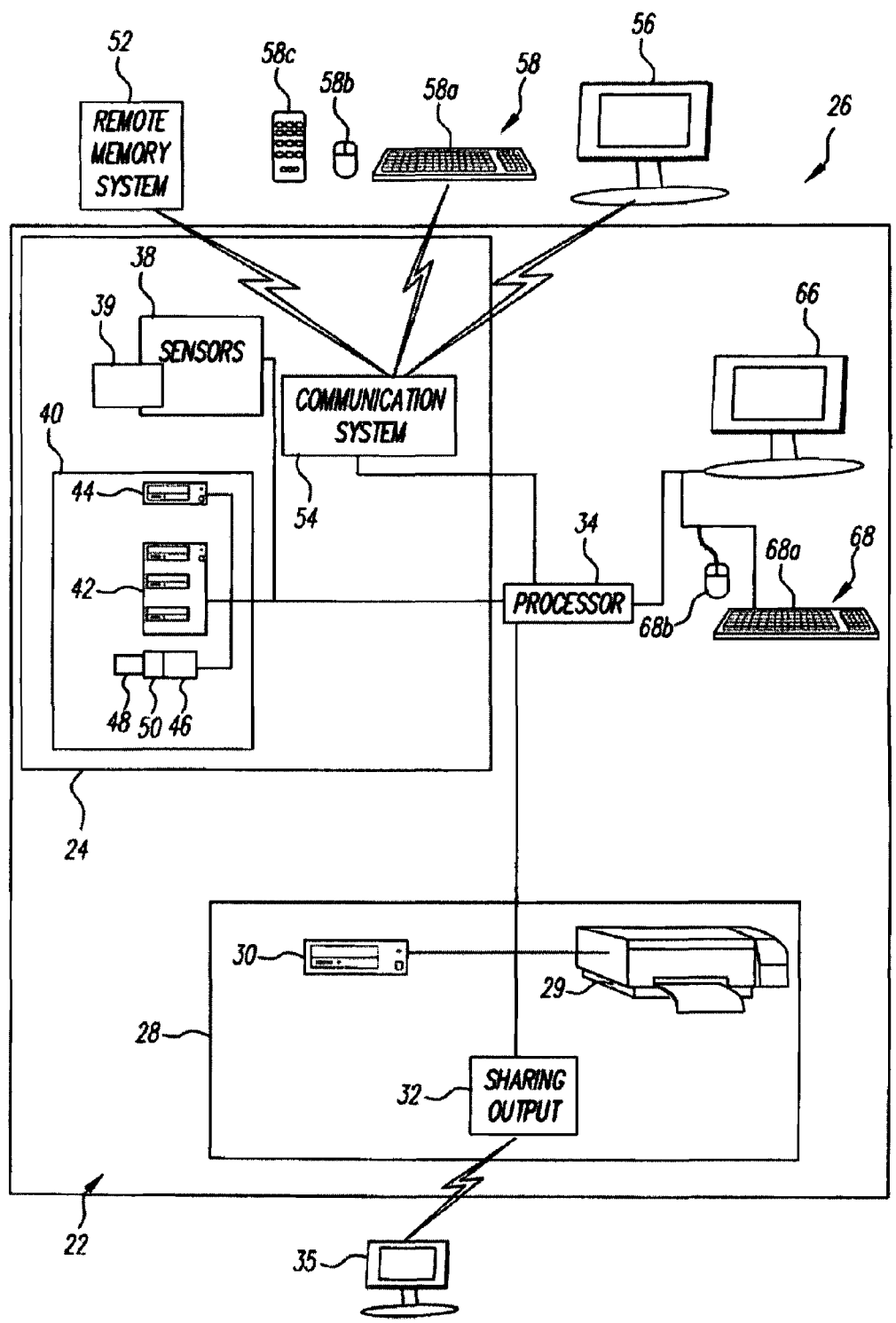
FIG. 1 is a high-level diagram showing the components of a system for generating a tag layout according to one aspect of the present invention.

The present invention is directed to producing a combined image showing a layout generated by placing a first set of shapes within a second set of shapes while preserving criteria including a certain ordering of the first set of shapes, amount of overlap of the first set of shapes as placed in the second set of shapes, or the scaling of the first or second set of shapes. According to an aspect of the present invention, the first set of shapes can be a set of tags, with an ordering associated with the tags, the second set of shapes can be a set of closed shapes or polygons, and the combined image can be a generated tag layout. FIG. 1 illustrates an electronic system 26, a computer system, for implementing certain aspects of the present invention for generating tag layouts. In the embodiment of FIG. 1, electronic computer system 26 comprises a housing 22 and a source of content and program data files 24 such as software applications, image files, sets of tags, ordering of tags, and closed shapes, which includes processor accessible memory 40, a wired user input system 68 as well as an online printing service 58, and an output system 28, all communicating directly or indirectly with processor 34. Although not shown processor 34 is meant to illustrate typical processor system and chip components such as instruction and execution registers, an ALU, various levels of cache memory, etc. The source of program and content data files 24, user input system 68, or output system 28, and processor 34 can be located within housing 22 as illustrated. Circuits and systems of the source of content and program data files 24, user input system 68 or output system 28 can be located in whole or in part outside of housing 22. As an example, element 68b illustrates a screen pointer control embodied as a mouse when located outside the housing 22 but can be an embedded trackball when located within housing 22.

The source of content or program data files 24 can include any form of electronic, optical, or magnetic storage such as optical discs, storage discs, diskettes, flash drives, etc., or other circuit or system that can supply digital data to processor 34 from which processor 34 can load software applications, image files, sets of tags, ordering of tags, and closed shapes or receive software applications, image files, sets of tags, ordering of tags, and closed shapes required to generated a tag layout. In this regard, the content and program data files can comprise, for example and without limitation, software applications, a still image data base, image sequences, a video data base, graphics, and computer generated images, sets of tags, ordering of tags, closed shapes and any other data necessary for practicing aspects of the present invention as described herein. Source of content data files 24 can optionally include devices to capture images to create content data for use in content data files by use of capture devices and/or can obtain content data files that have been prepared by or using other devices or image enhancement and editing software. In FIG. 1, sources of content or program data files 24 include sensors 38, processor accessible memory 40, and a communication system 54.

Sensors 38 are optional for particular aspects of the present invention and can include light sensors, biometric sensors, and other sensors known in the art that can be used to detect conditions in the environment of system 26 and to convert this information into a form that can be used by processor 34 of system 26. Sensors 38 can also include one or more cameras, video sensors, scanners, microphones, PDAs, palm tops, laptops that are adapted to capture images and can be coupled to processor 34 directly by cable or by removing portable memory 39 from these devices and/or computer systems and coupling the portable memory to slot 46. Sensors 38 can also include biometric or other sensors for measuring involuntary physical and mental reactions. Such sensors including, but not limited to, voice inflection, body movement, eye movement, pupil dilation, body temperature, and p4000 wave sensors.

Processor accessible memory 40 can include conventional digital memory devices including solid state, magnetic, optical or other data storage devices, as mentioned above. Processor accessible memory 40 can be fixed within system 26 or it can be removable and portable. In FIG. 1, system 26 is shown having a hard disk drive 42, which can be an attachable external hard drive, which can include an operating system for electronic computer system 26, and other software programs and applications such as the program algorithm aspects of the present invention, sets of tags, ordering of tags, closed shapes, software applications, and a digital image data base. A disk drive 44 for a removable disk such as an optical, magnetic or other disk memory (not shown) can also include control programs and software programs useful for certain embodiments of the present invention, and a memory card slot 46 that holds a removable portable memory 48 such as a removable memory card or flash memory drive or other connectable memory and has a removable memory interface 50 for communicating with removable memory 48, if necessary. Data including, but not limited to, control programs, image files, sets of tags, ordering of tags, closed shapes, software applications, digital images, and metadata can also be stored in a remote memory system 52 such as a personal computer, computer network, a network connected server, or other digital system.

In FIG. 1, system 26 has a communication system 54 that can be used to communicate with an online printing service 58, remote memory system 52, or remote display 56, for example by transmitting generated tag layouts and receiving from remote memory system 52, a variety of control programs, software applications, image files, sets of tags, ordering of tags, and closed shapes. Although communication system 54 is shown as a wireless communication system, it can also include a modem for coupling to a network over a communication cable for providing to the computer system 26 access to the network and remote memory system 52. An online printing service 58 including an online server 56 and/or remote input controls 58a, 58b, or 58c can communicate with communication system 54 wirelessly as illustrated or, again, can communicate in a wired fashion. In a preferred embodiment, a local input station including either or both of a local display 66 and local user input controls 68 (also referred to herein as "local user input 68") is connected to processor 34 which is connected to communication system 54 using a wired or wireless connection.

Communication system 54 can comprise for example, one or more optical, radio frequency or other transducer circuits or other systems that convert data into a form that can be conveyed to a remote device such as remote memory system 52 or remote display 56 using an optical signal, radio frequency signal or other form of signal. Communication system 54 can also be used to receive a digital image and other data, as exemplified above, from a host or server computer or network (not shown), a remote memory system 52 or an online printing service 58. Communication system 54 provides processor 34 with information and instructions from signals received thereby. Typically, communication system 54 will be adapted to communicate with the remote memory system 52 by way of a communication network such as a conventional telecommunication or data transfer network such as the internet, a cellular, peer-to-peer or other form of mobile telecommunication network, a local communication network such as wired or wireless local area network or any other conventional wired or wireless data transfer system.

User input system 68 provides a way for a user of system 26 to provide instructions to processor 34, such instructions comprising automated software algorithms of particular aspects of the present invention that generate tag layouts. This software also allows a user to make a designation of content data files, such as sets of tags, closed shapes, and ordering of tags, to be used in generating a tag layout according to an aspect of the present invention and to select an output form for the output product. User controls 68a, 68b or 58a, 58b in user input system 68 and online printing service 58, respectively, can also be used for a variety of other purposes including, but not limited to, allowing a user to arrange, organize and edit content data files, such as image files, sets of tags, ordering of tags, and closed shapes to be used to generate the tag layout, for example, by incorporating image editing software in computer system 26 which can be used to edit tag layout generated by computer system 26, to provide information about the user or audience, to provide annotation data such as voice and text data, to identify characters in the content data files, and to perform other interactions with system 26.

In this regard user input system 68 can comprise any form of device capable of receiving an input from a user and converting this input into a form that can be used by processor 34. For example, user input system 68 can comprise a touch screen input 66, a touch pad input, a 4-way switch, a 6-way switch, an 8-way switch, a stylus system, a trackball system, a joystick system, a voice recognition system, a gesture recognition system, a keyboard 68*a*, mouse 68*b*, a remote control or other such systems. In FIG. 1, electronic computer system 26 includes an online printing system 58 including, but not limited to, a remote keyboard 58*a*, a remote mouse 58*b*, and a remote control 58*c*. Similarly, local input 68 can take a variety of forms. In FIG. 1, local display 66 and local user input 68 are shown directly connected to processor 34.

Figure 2:
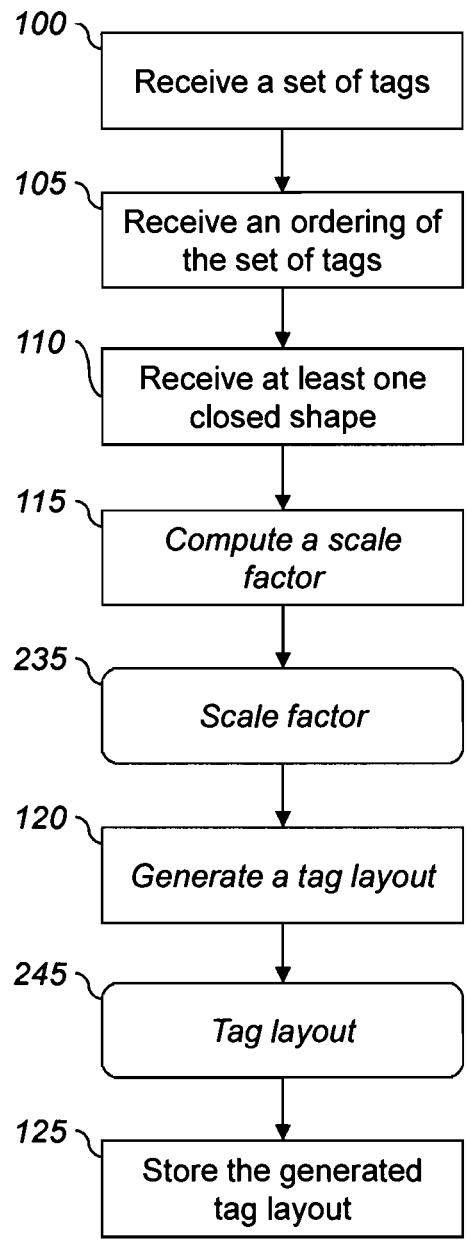
FIG. 2 is a flowchart showing a method for generating a tag layout according to one aspect of the present invention.

FIG. 2 shows a flowchart for generating the tag layout according to one aspect of the present invention. It will be understood that this flowchart, and the other flowcharts described hereafter, are representative of algorithms practiced by the processor 34 shown in FIG. 1. In step 100 of FIG. 2, the set of tags 205 is received. Each tag in the set of tags 205 includes a text label and a size for the text label. The size of the text label can be represented as a font size for displaying the text label. The size of the text label can be determined by counting the frequency of occurrence of the tag in a set of documents, image metadata, or labels. An ordering of the set of tags 205 is received in step 105. This ordering can be alphabetical order or generated using semantic analysis. Next, at least one closed shape, corresponding to a space for the tag layout 245, is received in step 110. In 2-D space, such a shape can be represented by a set of polygons 200 of arbitrary shape. In addition, each polygon 800 in the set of polygons 200 can be separate from each other or connected to each other. From this point on in this text, the terms closed shape, set of polygons 200, and polygon 800 will be used interchangeably. In step 115, processor 34 is used to compute a scale factor 235 for at least one of the polygons 800 in the set of polygons 200 or the size of the text labels in the set of tags 205. In step 120, the tag layout 245 is generated. All the tags in the set of tags 205 fit within the set of polygons 200 and there is no overlap between the tags as laid out in the generated tag layout 245. The tags are placed in the space based at least upon the ordering of the tags in the set of tags 205. The generated tag layout 245 is stored in processor accessible memory 40 in step 125.

Figure 3:
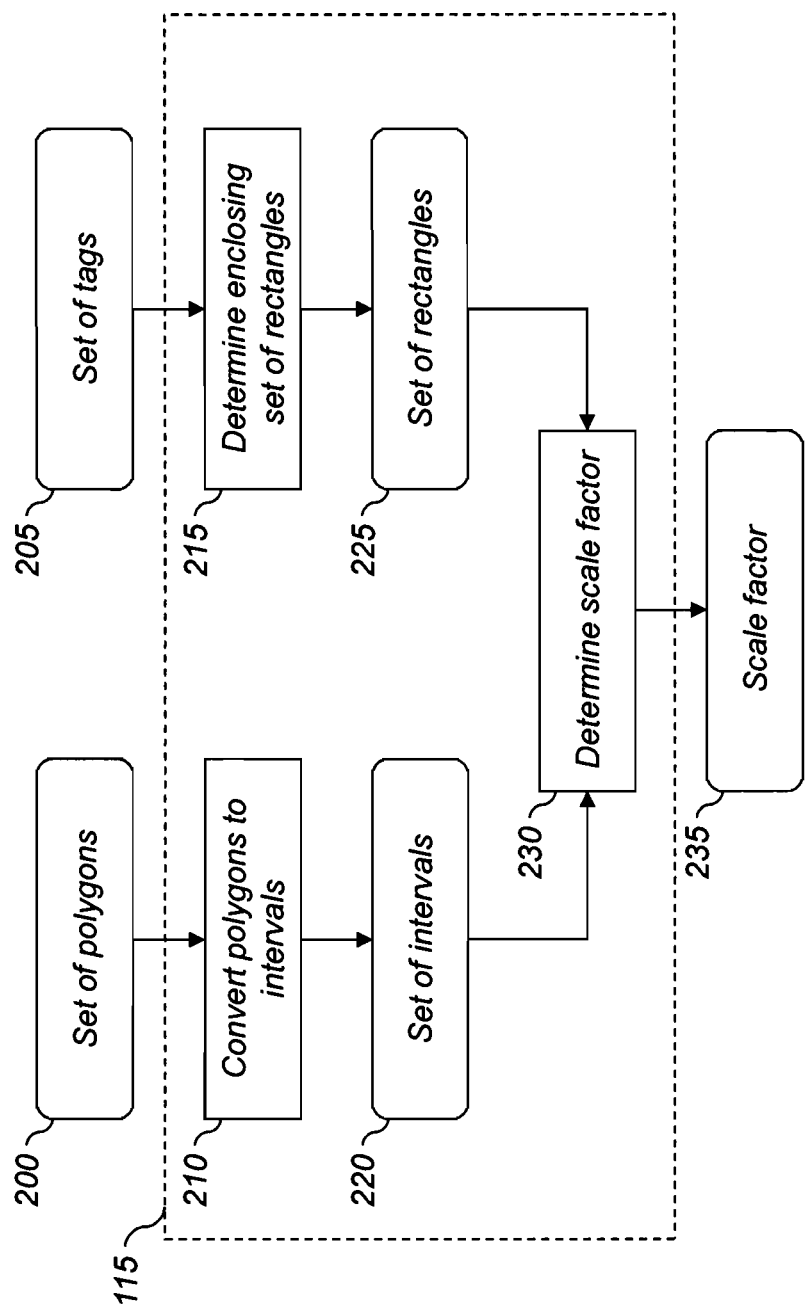
FIG. 3 is a flowchart showing a method for computing a scale factor according to one aspect of the present invention.
Figure 4:
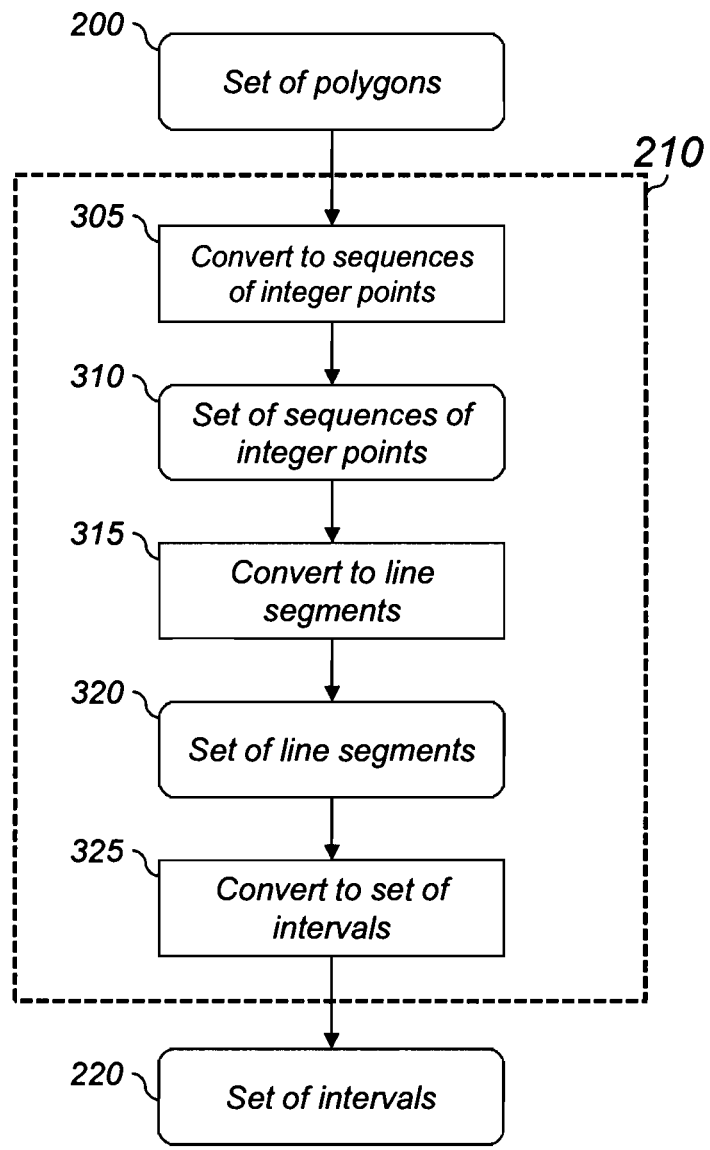
FIG. 4 is a flowchart showing additional details for step 210 of FIG. 3.

FIG. 3 shows a flowchart for computing the scale factor 235 according to step 115 of FIG. 2. The set of polygons 200 is provided as input to step 210. Step 210 converts the set of polygons 200 to a set of intervals 220. The details of step 210 are shown in FIG. 4 and will be described later in the specification. The set of tags 205 is provided as input to step 215. In step 215, an enclosing set of rectangles 225 is determined. The number of tags in the set of tags 205 is represented as N. These tags can have different font sizes. The tags are represented by a set of rectangles 225 denoted by T, where $T=\{T_k | 0 \le k \le N-1\}$. The width $w_k$ and height $h_k$ of a rectangle $T_k$, are set by the length and height of the $k+1^{th}$ tag so that the rectangle $T_k$ can enclose the $k+1^{th}$ tag compactly. The first rectangle is labeled $T_0$ and the last rectangle is labeled $T_{N-1}$. In various aspects of the present invention, an amount of overlap between the tags in the tag layout 245 can be controlled using empty boundary space around each tag in the set of tags 205. The set of intervals 220 is provided to step 230 to determine the scale factor 235.

In one aspect of the present invention, step 115 can be performed iteratively to generate the tag layout 245. In this case, the processor 34 can compute the scale factor 235 for the polygon 800 that can compactly accommodate the ordered set of tags such that the following criteria are adhered to.

The layout preserves the order of tags.

Different tags do not overlap within the polygon.

Figure 11:
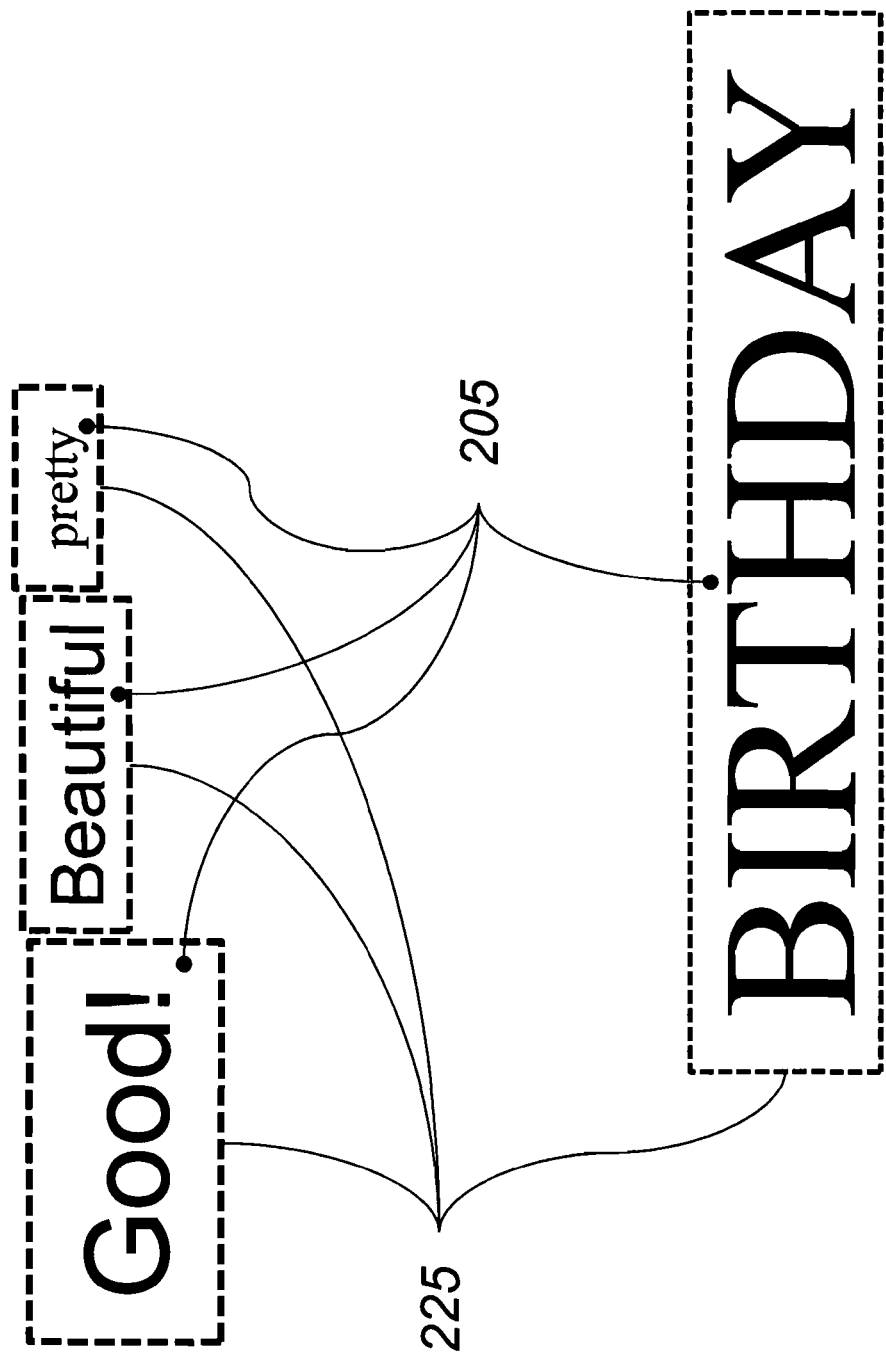
FIG. 11 shows an example of a set of tags with associated enclosing set of rectangles.
Figure 12:
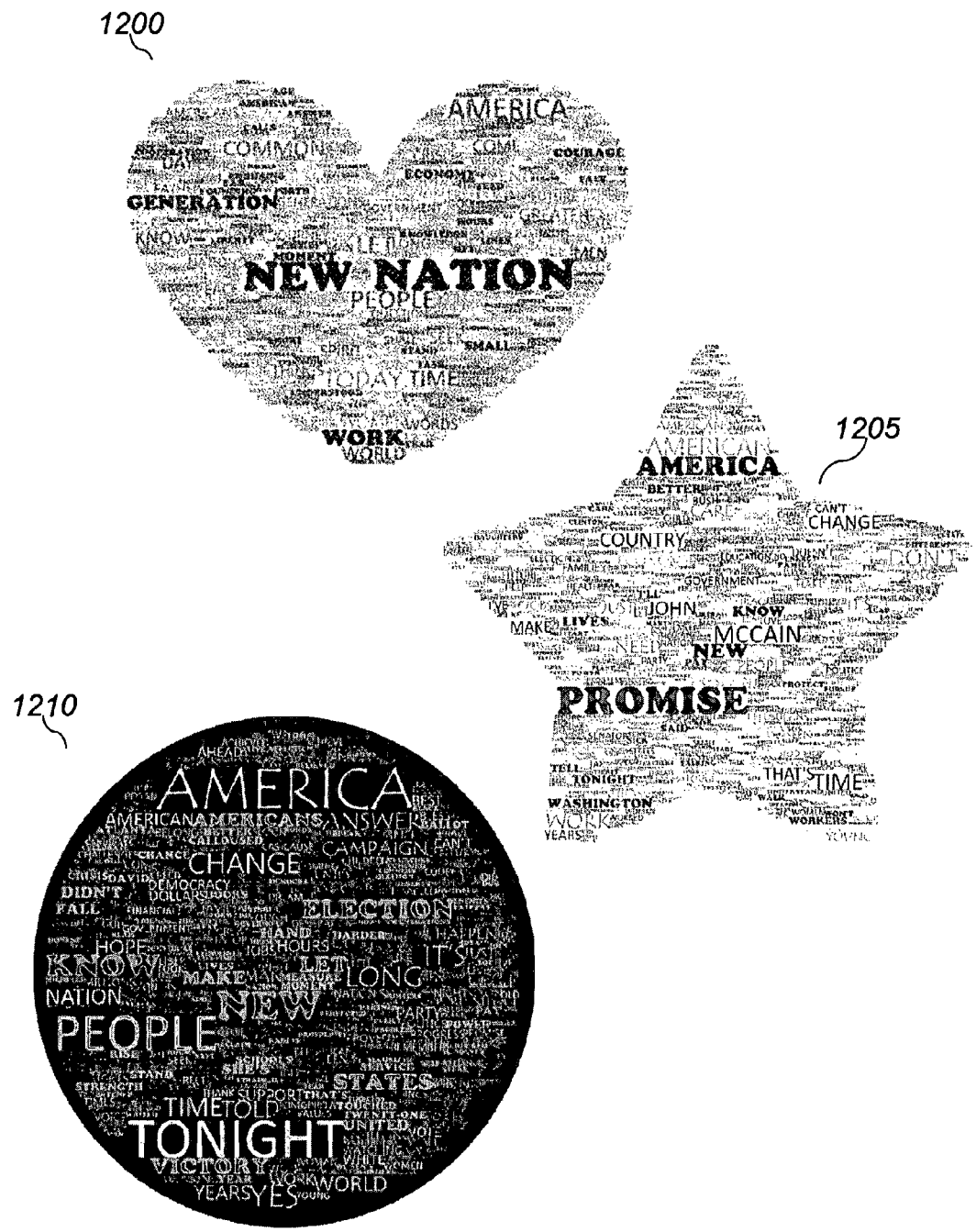
FIG. 12 shows examples of generated tag-layouts.

In some aspects of the present invention, the generated tag layout 245 can preserve the order of tags going left-right or top-bottom as shown in FIG. 12 and described later in the specification. In other aspects of the present invention, the order of tags is not strictly preserved and overlap of different tags can be customized depending on a user's preference. Tags are represented by rectangles whose dimensions can be determined by their font size and word length. Therefore the layout problem is synonymous with the problem of fitting multiple sized rectangles within an arbitrary shaped polygon and preserving a certain order in the layout. FIG. 11 shows an example of tags within the set of tags 205 and the enclosing set of rectangles 225. The tag "BIRTHDAY" has the largest size, therefore, the corresponding rectangle that fully encloses this tag is the largest in size. Other rectangles that fully enclose the other tags are sized appropriate to the sizes of the corresponding tags.

Figure 8:
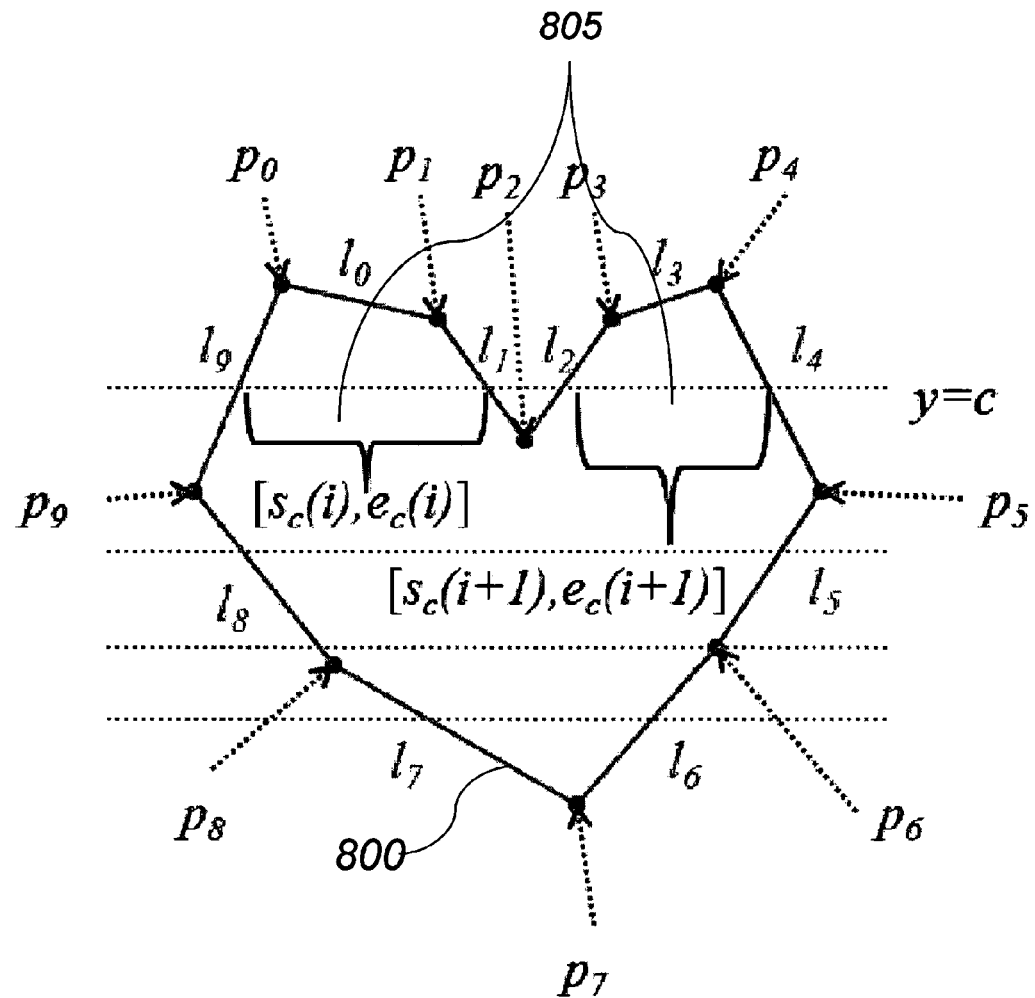
FIG. 8 shows an illustration of converting a polygon to a set of intervals.

To aid understanding of step 210, FIGS. 4 and 8 will be simultaneously described. FIG. 4 shows step 210 of converting the set of polygons 200 to the set of intervals 220. The set of polygons 200 can be converted to a set of sequences of integer points 310 using step 305. The set of sequences of integer points 310 is converted to a set of line segments 320 using step 315. The set of line segments 320 is converted to the set of intervals 220 using step 325. FIG. 8 shows the polygon 800, from the set of polygons 200, the set of line segments 320, and the converted set of intervals 220 in accordance with an aspect of the present invention.

In step 315, the set of sequences of integer points 310 denoted by S is converted to the set of line segments 320. Equation 1 can be used to represent the polygon 800 as the set of sequence of integer points 310 using n points.

$$S=\{p_i=(x_i,y_i)|0\le i<n\} \quad (1)$$

where S is the set of sequence of integer points 310, $p_i$ is an $i^{th}$ point on the polygon 800, and $x_i$ and $y_i$ are coordinates of the $i^{th}$ point. The set of sequence of integer points 310 S can be converted to the set of line segments 320 denoted by L using Equation (2) as illustrated in FIG. 8 and described below.

$$L=\{l_i=\overline{p_ip_j}|0\le i<n, j=(i+1)\%(n+1)\} \quad (2)$$

where $l_i$ is a line segment joining neighboring points $p_i$ and $p_j$ and the % represents a remainder of a division operation where (i+1) is divided by (n+1). In an aspect of the present invention, there is at least one sequence of integer points 310 S, and therefore, there is at least one set of line segments 320 L.

The set of line segments 320 can be converted to the set of intervals 220 using step 325. Equation 3 describes a set of horizontal lines $L_H$ at a plurality of integer locations y.

$$L_H=\{y=c|\lceil y_{min}\rceil\le c\le\lfloor y_{max}\rfloor\} \quad (3)$$

where $y_{min}$ and $y_{max}$ are a minimum and a maximum value of y respectively, $\lceil y_{min}\rceil$ and $\lfloor y_{max}\rfloor$ mean mathematical ceiling and flooring operations on $y_{min}$ and $y_{max}$ respectively, and c is an integer value between $\lceil y_{min}\rceil$ and $\lfloor y_{max}\rfloor$ in one aspect of the present invention. However, $y_{min}$, $y_{max}$, and c can be real numbers in other aspects of the invention. Next, the intersections between the set of line segments 320 and $L_H$ are determined. As illustrated in FIG. 8, a horizontal line at a location where y=c has 4 intersections with lines $l_1$, $l_2$, $l_4$, and $l_9$. A subset of intervals at a particular location 805 is produced as a result of these intersections.

The set of intervals 220 denoted by R is constructed as described in Equation 4.

$$R = \{r_c(i) = [s_c(i), e_c(i)] | \lceil y_{min} \rceil \le c \le \lfloor y_{max} \rfloor, 0 \le i \le M-1\} \quad (4)$$

where $r_c(i)$ is an $i^{th}$ interval at location c, $S_c(i)$ is a starting location of the interval $r_c(i)$, $e_c(i)$ is an ending location of the interval $r_c(i)$, M is the number of unique intervals determined by the intersections of $L_H$ and the set of line segments 320. For example, FIG. 8 shows location y=c has intersections with $l_1$, $l_2$, $l_4$, and $l_9$ and produces two intervals $r_c(0)=[s_c(0), e_c(0)]$ and $r_c(1)=[s_c(1), e_c(1)]$. For the set of sequences of integer points 310 having more than one sequence, corresponding to the set of polygons 200 having more than one polygon 800, each sequence of integer points will be processed in the same manner described above to produce multiple sets of intermediate intervals. The set of intervals 220 is produced by a mathematical set union operation on all of the multiple sets of intermediate intervals.

Figure 5:
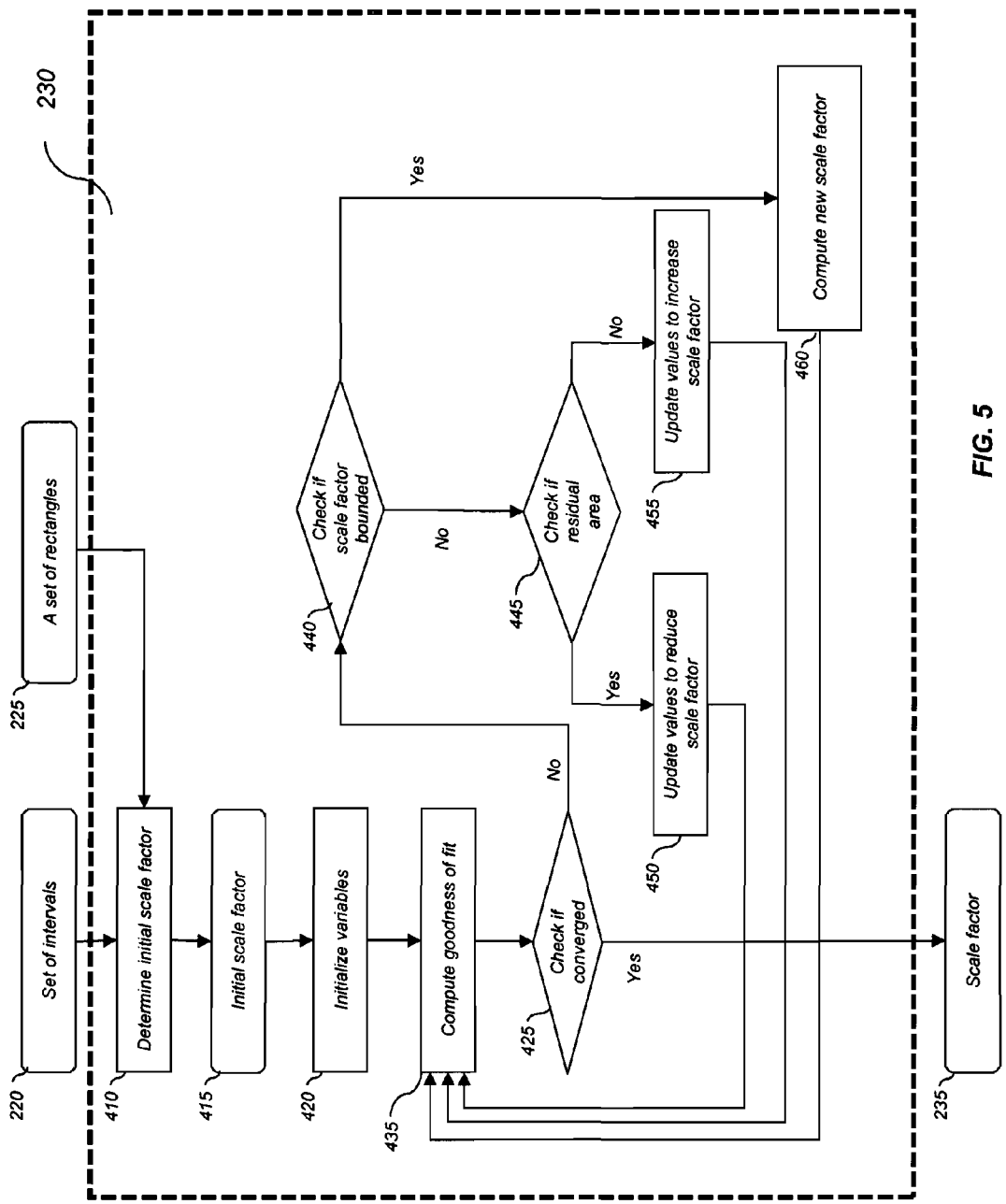
FIG. 5 is a flowchart showing additional details for step 230 of FIG. 3 according to one aspect of the present invention.

FIG. 5 shows a flowchart describing additional details for step 230. An effective aspect of the present invention is that the computed scale factor 235 generates the tag layout 245 that has a good fit for the set of tags 205 into the set of polygons 200. This problem can be formulated as a root-finding problem where the space of scale factor 235 values is searched for possible solutions. Those skilled in the art will appreciate that search methods such as bisection and secant search can be employed to solve the root-finding problem.

The flow chart of FIG. 5 is summarized first and details of each step are described later in the specification. An initial scale factor 415, which is denoted by $s^{(0)}$, is computed in step 410 using the set of rectangles 225 and the set of intervals 220 as inputs. Next, the rectangle $T_k$ is inserted into the polygon 800 at initial scale factor 415 $s^{(0)}$. The polygon 800 at initial scale factor 415 $s^{(0)}$ can be represented as $R \times s^{(0)}$. Equation 5 describes how to construct the polygon 800 $R \times s^{(0)}$.

$$R \times s^{(0)} = \{r_c(i) = [(s_c(i) \times s^{(0)})^*, (e_c(i) \times s^{(0)})^*]\} \quad (5)$$

where c is in an interval $\lceil y_{min} \times s^{(0)} \rceil \le c \le \lfloor y_{max} \times s^{(0)} \rfloor$ and * represents a mathematical rounding operation to the closest integer. The scale factor 235 s is increased when all of the rectangles $T_k$ are not inserted into the polygon R×s and the scale factor 235 s is reduced when there is a residual space after the successful insertion of all of the rectangles $T_k$ into the polygon R×s.

Figure 10:
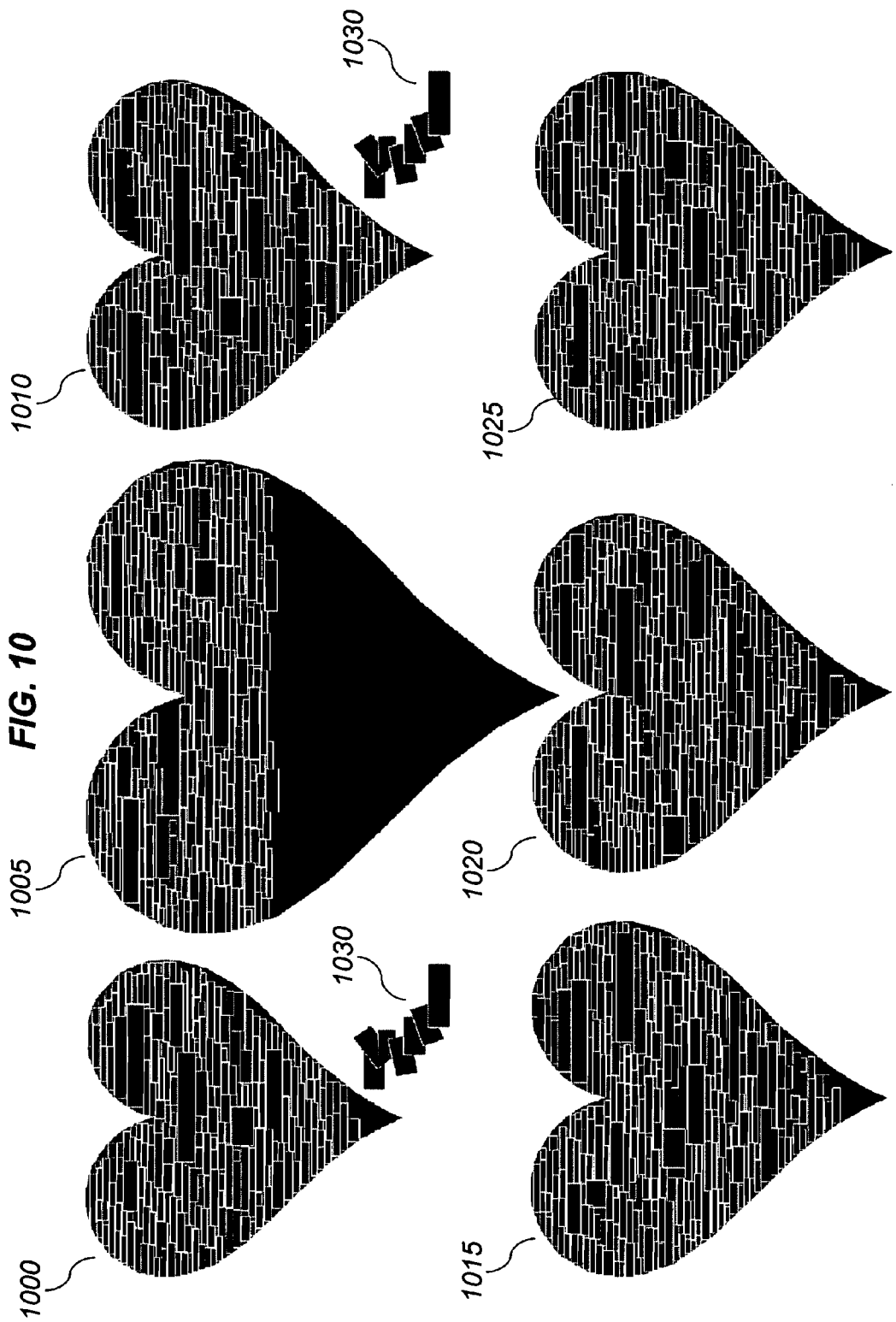
FIG. 10 shows examples of inserting a set of tags into a polygon using various scale factors.

Equation 6 describes how to compute a residual area 675 denoted by $A_r^+(R')$ if all of the rectangles $T_k$ are inserted into an updated set of intervals R'.

$$A_r^+(R') = \sum_{i=0}^{M-1} \sum_{c=\lceil y_{min} \rceil}^{\lfloor y_{max} \rfloor} (e_c'(i) - s_c'(i) + 1) \quad (6)$$

where R', $e_c'(i)$, and $s_c'(i)$ denote updated values of R, $e_c(i)$, and $s_c(i)$ after the insertion of the set of rectangles 225 into the set of intervals 220, respectively. To aid in understanding, an aspect of the present invention is now described with reference to FIG. 10. FIG. 10 shows examples when the polygon 800 is scaled using various scale factors to insert the set of rectangles 225 into the set of intervals 220. FIG. 10 shows a result 1005 of inserting the set of rectangles 225 at a particular scale factor, a result 1015 with another particular scale factor, and a result 1020 with yet another particular scale factor. The example results 1005, 1015, and 1020 also show the residual area 675 $A_r^+(R')$ left after insertion of the set of rectangles 225 into the polygon 800 as empty blank space.

If only ν number of rectangles $T_k$, where ν is less than the total number of rectangles N in the set of rectangles 225, are inserted into the set of intervals 220, an overflow area 670 denoted by $A_r^-(\nu)$ can be computed as described in Equation 7.

$$A_r^-(\nu) = \sum_{i=\nu}^{N-1} w_k \times h_k \quad (7)$$

where $W_k$ and $h_k$ are the width and the height of $T_k$, respectively. A result 1000 with a particular scale and a result 1010 with another particular scale are shown in FIG. 10. In these results, some of the rectangles $T_k$ were not inserted into the set of intervals 220 and are shown as uninserted rectangles 1030. Result 1025 shows the final generated tag layout 245 at the scale factor 235.

Referring back to FIG. 5, the flowchart shown describes an algorithm for scaling the polygon 800, represented as the set of intervals 220, such that the set of rectangles 225 can be inserted into the polygon 800 compactly.

Equation 8 describes how to set the initial scale factor 415 denoted by $s^{(0)}$.

$$s^{(0)} = \frac{A_r^-(0)}{A_r^+(R)} \quad (8)$$

where $A_r^+(R)$ is computed by setting R'=R in Equation 6 and $A_r^-(0)$ is computed by setting ν=0 in Equation 7.

In step 420, variables used to compute the scale factor 235 are initialized. In one aspect of the present invention, these variables include f representing a goodness of fit 690 of inserting the set of rectangles 225 into the set of intervals 220 at a particular scale factor 235 s, $s^+$ representing the scale factor 235 that satisfies f>0, $f^+$ representing the goodness of fit 690 for $s^+$, $s^-$ representing the scale factor 235 that satisfies f<0, $f^-$ representing the goodness of fit 690 for $s^-$, and Δs representing a change in scale factor 235. In one aspect of the present invention, these variables can be initialized as f=1, step=0.5, s=$s^{(0)}$, $s^+$=−1, $s^-$=−1, $f^-$=0, $f^+$=0, and Δs=∞. In step 435, the goodness of fit, f, is computed and if there is residual area 680, then $s^+$ is set to s and $f^+$ is set to f. If f<0, meaning some of the tags were not inserted into the set of intervals 220, then $s^-$ is set to s and $f^-$ is set to f. Step 435 is shown in detail in FIG. 7 and will be described later in the specification.

In step 425, the convergence of the root-finding algorithm is checked. If Δs>ϵ or f<0, the root-finding algorithm has not converged, meaning either the change in scale factor 235 is greater than a threshold ϵ or some tags were not inserted into the polygon 800. If Δs≤ϵ and f≥0, the root-finding algorithm has converged, meaning all of rectangles $T_k$ have been inserted into the set of polygons 200 and the change in scale factor 235 between a previous iteration and the current iteration is smaller than the threshold ϵ. In this case, the value of the scale factor 235 is output to the algorithm described in the flowchart of FIG. 3. If the root-finding algorithm has not converged, the next step is 440. In step 440, the values of $s^-$ and $s^+$ are used to compute a bounding interval. This bounding interval is evaluated to determine if an appropriate scale factor 235 can be found within the bounding interval. If $s^-=-1$ or $s^+=-1$, the appropriate scale factor 235 is not within the bounding interval and the algorithm resumes at step 445. In step 445, the goodness of fit 690 is checked to determine if there is residual area 680. If there is residual area, the scale factor 235 is reduced in step 450 and a new goodness of fit 690 is computed. If there is overflow area 670, the scale factor 235 is increased in step 455 and a new goodness of fit 690 is computed. If the scale factor 235 is within the bounding interval, the algorithm resumes at step 460. In step 460, a new scale factor $s_{new}$ is computed. The new scale factor can be computed using methods well known in the art, such as the secant method. Equation 9 describes how to compute the new scale factor using the secant method.

$$s_{new} = -f^+ \times \frac{s^+ - s^-}{f^+ - f^-} + s^+ \qquad (9)$$

The new scale factor is used to compute a new goodness of fit 690 as described in step 435. This process continues iteratively until the root-finding algorithm converges as described in step 425.

Figure 6:
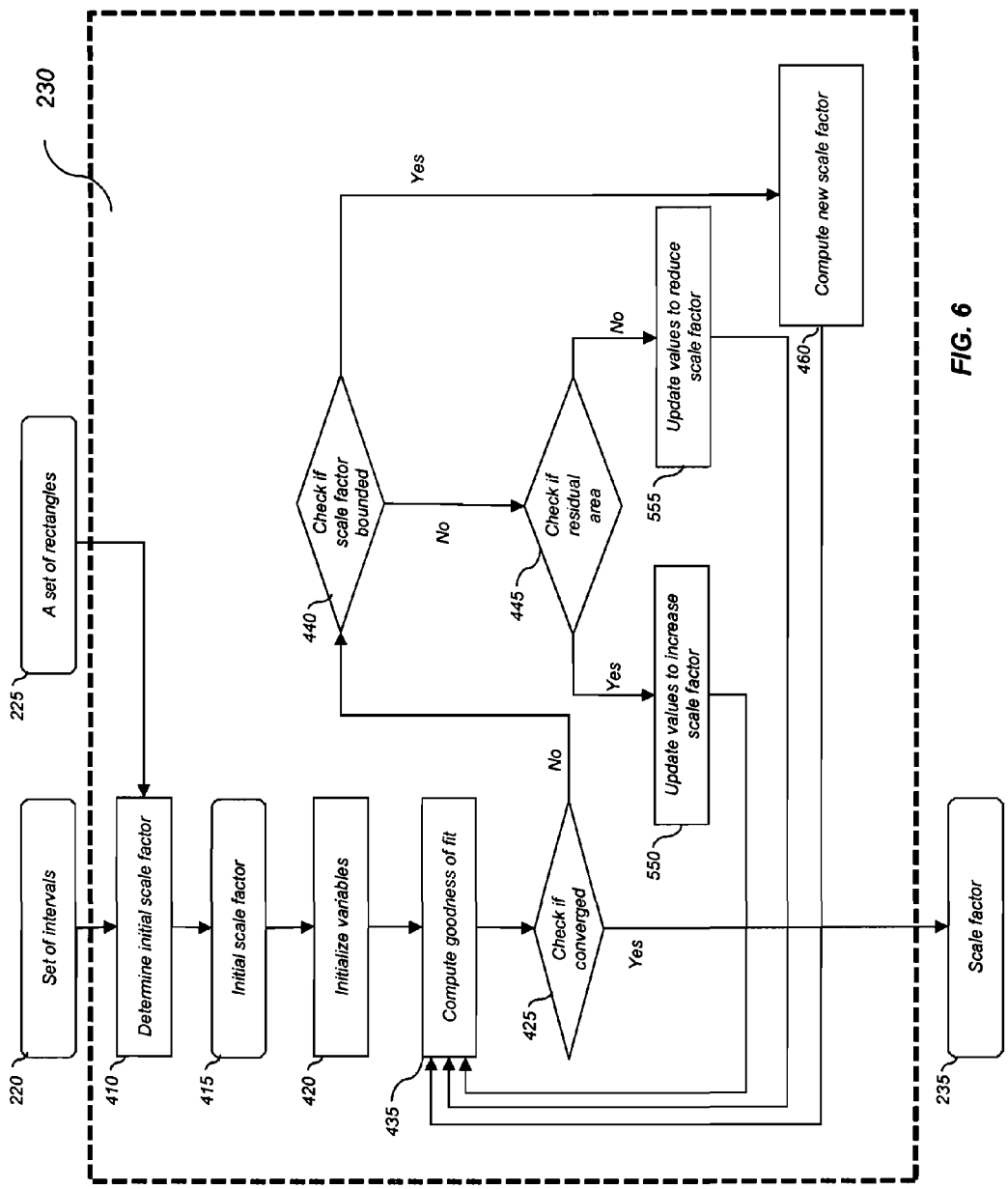
FIG. 6 is a flowchart showing additional details for step 230 of FIG. 3 according to another aspect of the present invention.

FIG. 6 is similar to FIG. 5 and where the steps and blocks correspond, they will have the same numbers, but when the functions are different, the steps and blocks will be described below. FIG. 6 shows a flowchart that describes an algorithm for scaling the set of tags 205, represented as the set of rectangles 225, such that they can be inserted into the set of intervals 220, representing the set of polygons 200, compactly according to another aspect of the present invention. In the algorithm described by the flowchart shown in FIG. 6, steps 550 and 555 are different from FIG. 5. In step 550 the scale factor 235 s of the set of rectangles 225 is increased since there is residual area present. In step 555, the scale factor 235 s of the set of rectangles 225 is decreased since all the rectangles were not inserted.

Figure 7:
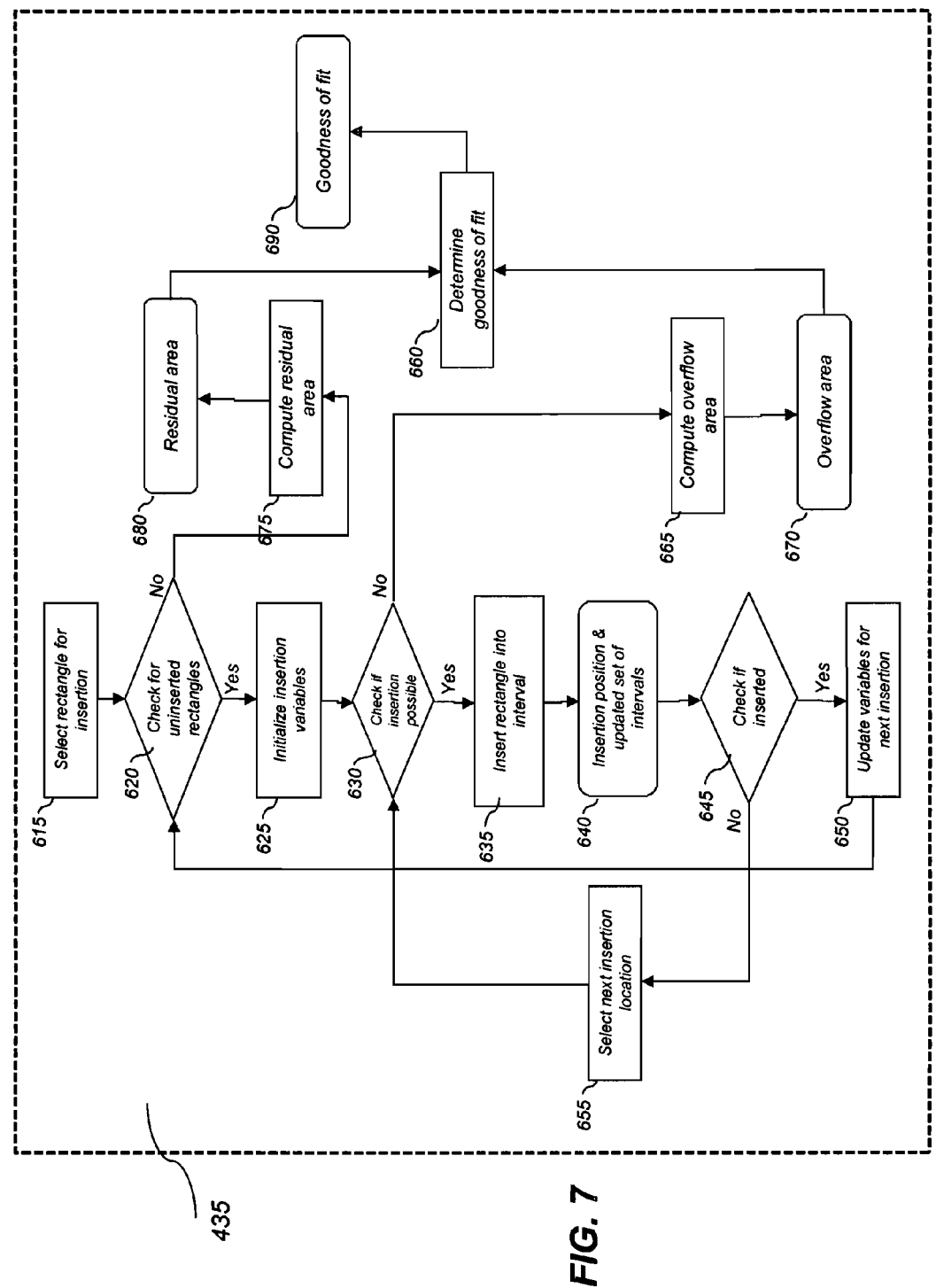
FIG. 7 is a flowchart showing additional details for step 435 of FIG. 5 and FIG. 6.

FIG. 7 shows a flowchart describing an algorithm for computing the goodness of fit 690. In step 615, the first rectangle $T_0$ is selected by setting k=0. Step 615 is followed by decision step 620. In step 620, a check for uninserted rectangles 1030 is performed. If there are uninserted rectangles 1030, the algorithm resumes with step 625 else the algorithm resumes with step 675. In step 675, the residual area 680 $A_r^+(R')$ can be computed using Equation 6, where R' is the aforementioned updated set of intervals. In a following step 660, the residual area 680 $A_r^+(R')$ is used to determine goodness of fit 690. In step 625, the insertion variables are initialized. In an aspect of the present invention, the value of y is initialized to $y_{min}$ in step 625. Step 625 is followed by decision step 630. In step 630 the value of y is checked to determine if an insertion is possible. If $y \leq y_{max}$, the insertion is possible and the algorithm resumes with step 635 else the insertion is not possible and the algorithm resumes with step 665. In step 635, a rectangle from the set of rectangles 225 is inserted into a subset of intervals from the set of intervals 220. The details of step 635 will be described later in the specification. Step 635 produces an insertion position and the updated set of intervals 640. As mentioned before, the updated set of intervals is denoted by R'. In step 645, the insertion position denoted by x is checked. If x≠−1, the insertion was successful at 2D integer location (x,y) and the algorithm resumes with step 650 else the algorithm resumes with step 655 by setting y=y+1 as the next insertion location. In step 650, the values of k, and R are updated as k=k+1, and R=R'. In step 665, the overflow area 670 is computed by $A_r^-(k)$ by setting v=k in Equation 7. In the following step 660, the overflow area 670 multiplied by −1, that is −1×$Ar^-(k)$ is used to determine the goodness of fit 690.

In a particular aspect of the present invention, the order is loosely maintained from top left to the bottom right. In other words, the order of insertion of consecutive ordered rectangles is left to right. However, if there is a rectangle that can be fit into a blank space between two consecutive rectangles in the order specified by the ordering of the set of tags 205, the ordering can be ignored locally to achieve a good fit. In other aspects of the invention, the order is strictly maintained from top left to the bottom right and no insertion of tags is allowed out of order.

The set of rectangles 225 is inserted into the set of intervals 220 using step 635 iteratively for each rectangle. As discussed above, step 635 preserves the order of the insertion of rectangles from left to right. As the set of intervals 220 is filled with rectangles from the set of rectangles 225, the next rectangle $T_k$ is inserted into the set of intervals 220 at the leftmost available 2D integer location (x,y) where y is set either by step 625 or step 655 and x is determined by step 635.

Figure 9:
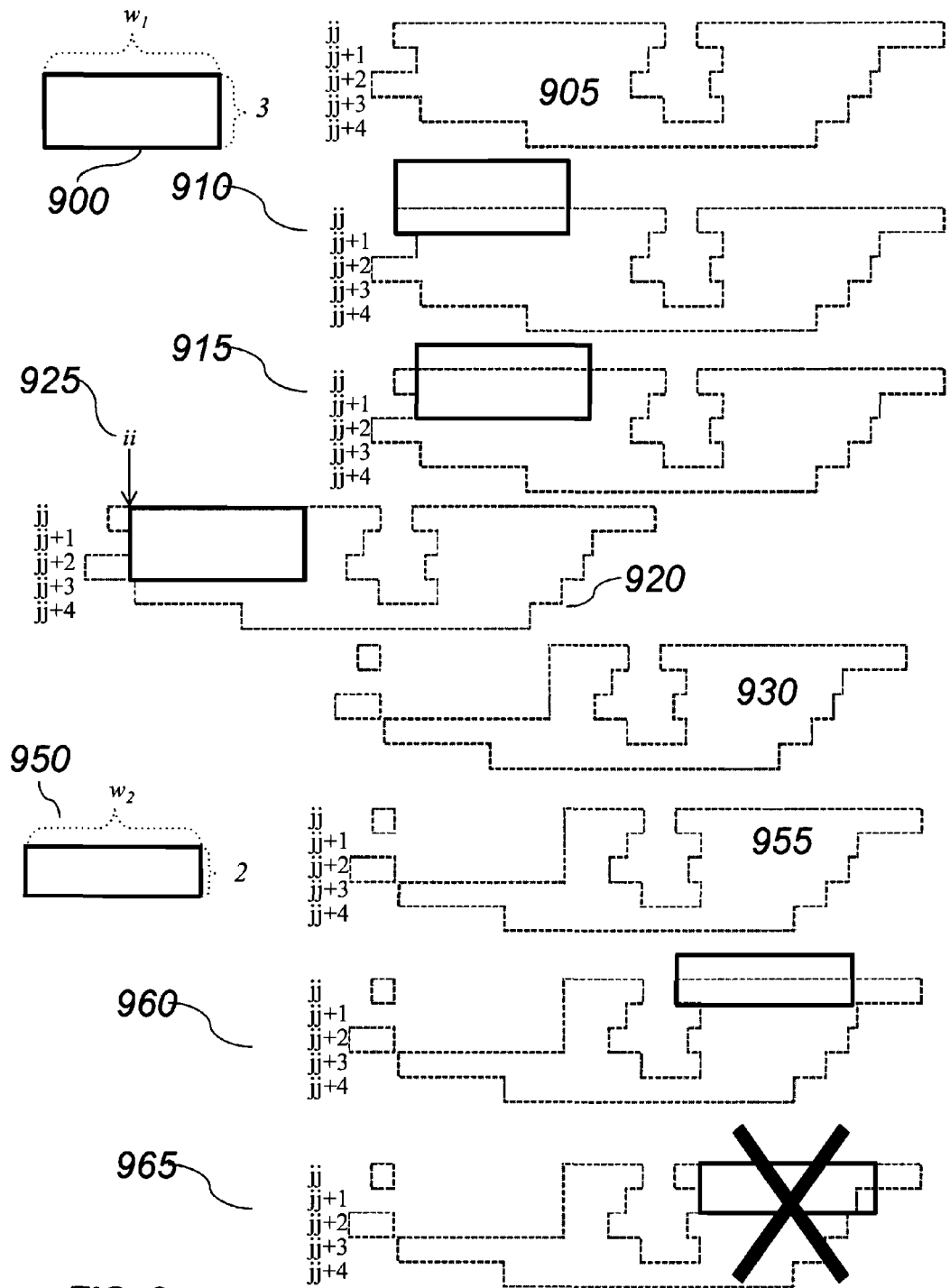
FIG. 9 shows an illustration of step 635 of FIG. 7.

FIG. 9 shows an illustration of an example of one method for inserting two rectangles 900 and 950 into a subset of intervals 905 while preserving left-right order. The first rectangle 900 to be inserted into the subset of intervals 905 has width $w_1$ and height 3. The rectangle 900 is placed at the leftmost available location y=jj in the subset of intervals 905 as shown in 910. In 915, the rectangle 900 is shifted down and to the right in the subset of intervals 905 at location y=jj+1. This rightward shift is performed because the leftmost available insertion location at y=jj+1 is at a different location than the leftmost available insertion location at y=jj. This process is performed iteratively until the rectangle 900 can be completely inserted into the subset of intervals 905 as shown in 920. After the rectangle 900 has been inserted into the subset of intervals 905, the 2D space occupied by the rectangle 900 is removed from the subset of intervals 905 and an updated subset of intervals 930 is formed. The upper left location 925 of the inserted rectangle, denoted by ii, and the updated subset of intervals 930 are used to insert the next rectangle as described in step 635.

It is possible that a rectangle 950 having width of $w_2$ and height 2 cannot be inserted into a subset of intervals 955. The rectangle 950 is positioned at the leftmost available location at y=jj for insertions as shown in 960. The rectangle 950 has to be shifted down to allow for complete insertion into the subset of intervals 955. However, as shown in 965, this results in the rectangle 950 extending outside the subset of intervals 955. In this case, the rectangle 950 cannot be inserted into the subset of intervals 955 at the current scale and an indication of this is returned to the algorithm of FIG. 7 by step 635. The algorithm changes the scale factor for the set of intervals 220 or the set of rectangles 225 and resumes by attempting to insert all the rectangles into the intervals at the changed scale factor.

FIG. 12 shows some examples of generated tag layouts 245. Examples include a heart-shaped tag layout 1200, a star-shaped tag layout 1205, and a circle shaped tag layout 1210. The generated tag layouts can have different color backgrounds. The fonts used for the tags can also be different colored.

Figure 13:
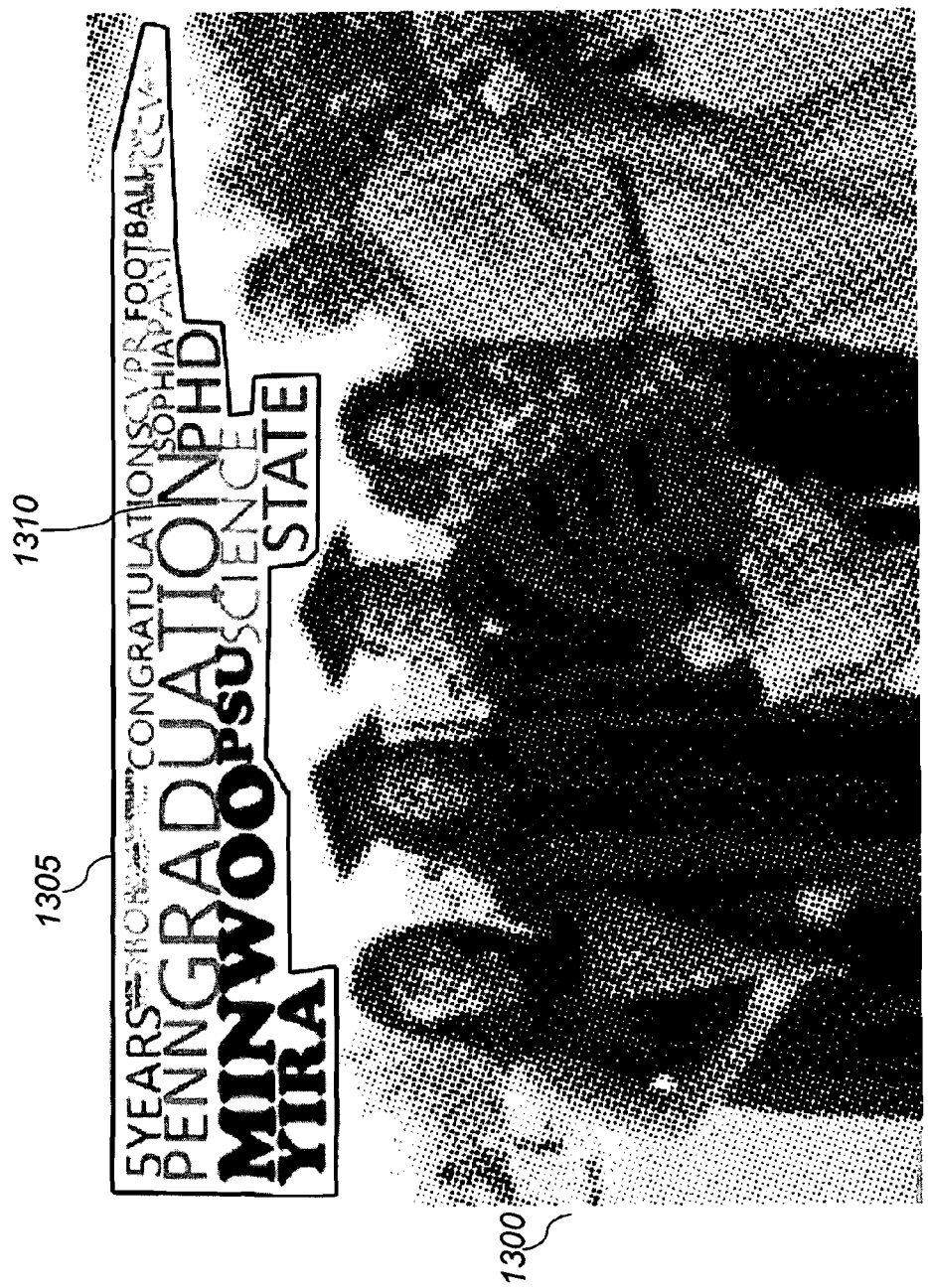
FIG. 13 shows an example of a print with a generated tag-layout.

FIG. 13 shows a user image 1300 with a sky region boundary 1305 corresponding to the closed shape for the tag layout. The generated tag layout 1310 is placed inside the sky region boundary 1305. The user mage 1300 with the placed tag layout 1310 can be printed using printer 29 or provided to online printing service 58 using the communication system 54 as shown in FIG. 1.

An aspect of the present invention has the constraint that there is an ordering associated with the set of tags 205. In one aspect of the present invention, the ordering of the set of tags 205 can be based on a semantic analysis of the set of tags 205. In this case, a co-occurrence matrix can be constructed for the set of tags 205. The co-occurrence matrix measures how often tags appear together in a given set of pictures or documents. The co-occurrence matrix can be clustered using methods well known in the art such as spectral clustering. The clustering of tags thus obtained can be used to derive an ordering for the tags such that tags within the same cluster are closer in the ordering while tags in different clusters are further in the ordering. In another aspect of the invention, page-rank, as taught in Page et al., can be computed for each tag based on the co-occurrence matrix. Tags can then be ordered directly based on their page-rank.

The semantic analysis can also be performed using natural language understanding. Natural language understanding involves classifying tags into their respective figures of speech (nouns, adjectives, verbs, adverbs etc.). Such a classification can be performed using WordNet, a lexical database of English language developed by the Cognitive Science Laboratory at Princeton University. WordNet is a lexical reference system that uses psycholinguistic theories of human lexical memory. The linguistic classification of tags obtained using WordNet can be used to derive an ordering for the tags such that tags within the same linguistic class are closer in the ordering while tags in different linguistic classes are further in the ordering. In another aspect of the invention page-rank can be computed for each tag based on a pairwise tags linguistic class matrix (wherein entry for a pair of tags is 1 only if they are in the same linguistic class and otherwise the entry is 0). Tags can then be ordered directly based on their page-rank.

In another aspect of the present invention, the ordering of the set of tags 205 can be performed based on user preference. A user's picture collection can be analyzed to reveal the user's preferences. Pictures in a user's collection can be annotated with words. The image annotations obtained from user's collection can be used to derive an ordering for the tags such that tags that are related to the image annotations are ranked higher in the ordering and tags that are unrelated to the image annotations are ranked lower in the ordering.

In another aspect of the present invention, there can be more than one closed shapes, represented using the set of polygons 200, for placing the set of tags 205 to generate the tag layout 245. In this case, the set of tags 205 has to be divided into subsets of tags. The number of subsets of tags is equal to the number of polygons 800 in the set of polygons 200. In one aspect of the present invention, the set of tags 205 is divided into subsets of tags based upon the relative sizes of the polygons 800 and the sizes of the tags in the set of tags. The sizes of all of the polygons 800 are added together to generate a total size for the set of polygons. A subset size for each polygon 800 in the set of polygons 200 is determined by computing a ratio between the size of the polygon 800 and the total size of all the polygons. The set of tags 205 is represented by the set of rectangles T 225, where the size of each rectangle in the set of rectangles 225 is based on the size of the corresponding tag. The sizes of all the rectangles in the set of rectangles 225 are added together to compute a total size for the rectangles to be placed into the set of polygons 200. The set of rectangles 225 can be divided into subsets based on the computed ratios between the sizes of the polygons 800 and the total size of all the polygons. The number of subsets of sets of rectangles 225 is equal to the number of polygons 800 in the set of polygons 200.

In one aspect of the present invention, the set of tags 205 is split into subsets based upon the ordering of the set of tags 205 such a polygon 800 in the set of polygons 200 has a subset of consecutive tags in the set of tags 205. In this aspect, the ordering is maintained within each polygon 800 independently of other polygons in the set of polygons 200. In another aspect of the present invention, the tags can be split across the polygons 800 such that the ordering is maintained across all the polygons simultaneously. In this case, the subset of tags associated with a polygon 800 may not have consecutive tags from the set of tags 205.

The invention has been described in detail with particular reference to preferred embodiments thereof, but it will be understood that variations and modifications can be effected within the spirit and scope of the invention.

| PARTS LIST | |
|---|---|
| 22 | housing |
| 24 | source of data files |
| 26 | system |
| 28 | system |
| 29 | printer |
| 30 | printer |
| 32 | I/O |
| 34 | processor |
| 35 | I/O |
| 38 | sensor |
| 39 | memory |
| 40 | processor accessible memory |
| 42 | storage |
| 44 | storage |
| 46 | memory card slot |
| 48 | memory |
| 50 | interface |
| 52 | memory |
| 54 | communication system |
| 56 | I/O |
| 58 | online printing service |
| 58a | I/O |
| 58b | I/O |
| 58c | I/O |
| 66 | I/O |
| 68 | I/O |
| 68a | I/O |
| 68b | I/O |
| 100 | receive a set of tags |
| 105 | receive an ordering of the set of tags |
| 110 | receive at least one closed shape |
| 115 | compute a scale factor |
| 120 | generate a tag layout |
| 125 | store the generated tag layout |
| 200 | set of polygons |
| 205 | set of tags |
| 210 | convert polygons to intervals |
| 215 | determine enclosing set of rectangles |
| 220 | set of intervals |
| 225 | set of rectangles |
| 230 | determine scale factor |
| 235 | scale factor |
| 245 | tag layout |
| 305 | convert to sequences of integer points |
| 310 | set of sequences of integer points |
| 315 | convert to line segments |
| 320 | set of line segments |
| 325 | convert to intervals |
| 410 | determine initial scale factor |
| 415 | initial scale factor |
| 420 | initialize variables |
| 425 | check if converged |
| 435 | compute goodness of fit |
| 440 | check if scale factor bounded |
| 445 | check if residual area |
| 450 | update values to reduce scale factor |
| 455 | update values to increase scale factor |
| 460 | compute new scale factor |
| 550 | update values to increase scale factor |

PARTS LIST

| | |
|---|---|
| 555 | update values to reduce scale factor |
| 615 | select rectangle for insertion |
| 620 | check for uninserted rectangles |
| 625 | initialize insertion variables |
| 630 | check if insertion possible |
| 635 | insert rectangle into interval |
| 640 | insertion position and updated set of intervals |
| 645 | check if inserted |
| 650 | update variables for next insertion |
| 655 | select next insertion location |
| 660 | determine goodness of fit |
| 665 | compute overflow area |
| 670 | overflow area |
| 675 | compute residual area |
| 680 | residual area |
| 690 | goodness of fit |
| 800 | a polygon in the set of polygons |
| 805 | subset of intervals at a particular location |
| 900 | rectangle A |
| 905 | set of intervals A |
| 910 | insertion progress A at y = jj |
| 915 | insertion progress A at y = jj + 1 |
| 920 | insertion progress A at y = jj + 2 |
| 925 | final leftmost available horizontal location |
| 930 | updated set of intervals A |
| 950 | rectangle B |
| 955 | set of intervals B |
| 960 | insertion progress B at y = jj |
| 965 | insertion progress B at y = jj + 1 |
| 1000 | tag layout at a first scale |
| 1005 | tag layout at a second scale |
| 1010 | tag layout at a third scale |
| 1015 | tag layout at a fourth scale |
| 1020 | tag layout at a fifth scale |
| 1025 | tag layout at a sixth scale |
| 1030 | uninserted rectangles |
| 1200 | Heart-shaped tag layout |
| 1205 | Star-shaped tag layout |
| 1210 | Circle shaped tag layout |
| 1300 | user image |
| 1305 | sky region boundary |
| 1310 | tag layout placed in user image |

The invention claimed is:

1. A method for generating a tag layout, comprising:
receiving a set of tags, each tag including a text label and a size for the text label;
receiving an ordering of the set of tags;
receiving at least one closed shape corresponding to a space for the tag layout;
using a processor to compute a scale factor for at least one of the closed shape or the size of the text labels in the set of tags to generate the tag layout of the set of tags within the closed shape such that all the tags in the set of tags fit within the closed shape and the tags are placed in the space based at least upon the ordering of the tags in the set of tags; and
storing the generated tag layout in processor accessible memory.

2. The method of claim 1 wherein the ordering of the set of tags is alphabetical.

3. The method of claim 1 wherein the ordering of the set of tags is based on a semantic analysis of the set of tags.

4. The method of claim 3 wherein the semantic analysis is performed using natural language understanding.

5. The method of claim 1 wherein the ordering of the set of tags is based on preference of a user.

6. The method of claim 1 wherein the closed shape is a polygon.

7. The method of claim 1 wherein there are at least two closed shapes further including dividing the set of tags into subsets of tags, wherein the number of subsets of tags is equal to the number of closed shapes.

8. The method of claim 7 wherein the set of tags is divided into subsets of tags based at least upon the relative sizes of the closed shapes and the tags in the set of tags and the ordering of the tags in the set of tags.

9. The method of claim 1 wherein the closed shape is user defined.

10. The method of claim 1 wherein the tags are placed in the space corresponding to the closed shape in left to right order followed by top to bottom order.

11. The method of claim 1 wherein the tags are placed in the space corresponding to the closed shape in top to bottom order followed by left to right order.

12. The method of claim 1 wherein the scale factor is computed for the closed shape.

13. The method of claim 1 wherein the scale factor is computed for the size of the text labels in the set of tags.

14. The method of claim 1 wherein the scale factor is computed for the both the closed shape and the size of the text labels in the set of tags.

15. The method of claim 1 further including using a printer to print the generated tag layout or providing the tag layout to an online printing service.

16. The method of claim 1 wherein there is no overlap between the tags in the generated tag layout.

17. The method of claim 1 wherein an amount of overlap between the tags in the generated tag layout can be adjusted based on user preference.

18. The method of claim 1 wherein an amount of overlap between the tags in the generated tag layout can be controlled using empty boundary space around each tag in the set of tags.

19. The method of claim 1 wherein the ordering of the tags in the set of tags can be ignored locally to achieve a good fit for the generated tag layout.

* * * * *